(12) United States Patent
Nakano et al.

(10) Patent No.: US 7,589,448 B2
(45) Date of Patent: Sep. 15, 2009

(54) AUTOMOTIVE ALTERNATOR HAVING FLEXIBLE BEARING COVER

(75) Inventors: Kazutoshi Nakano, Kariya (JP); Nobuhiro Shioya, Kariya (JP)

(73) Assignee: Denso Corporation, Kariya (JP)

( * ) Notice: Subject to any disclaimer, the term of this patent is extended or adjusted under 35 U.S.C. 154(b) by 408 days.

(21) Appl. No.: 11/586,598

(22) Filed: Oct. 26, 2006

(65) Prior Publication Data

US 2007/0103019 A1 May 10, 2007

(30) Foreign Application Priority Data

Nov. 10, 2005 (JP) .............................. 2005-325593

(51) Int. Cl.
*H02K 5/173* (2006.01)
*H02K 19/22* (2006.01)

(52) U.S. Cl. .......................................... 310/90; 310/91

(58) Field of Classification Search ................... 310/85, 310/88, 90, 91; 384/477, 482, 484, 489
See application file for complete search history.

(56) References Cited

U.S. PATENT DOCUMENTS

| | | | | | |
|---|---|---|---|---|---|
| 4,559,462 | A | * | 12/1985 | Hernandez-Badillo | 310/67 A |
| 4,959,577 | A | * | 9/1990 | Radomski | 310/263 |
| 5,087,847 | A | * | 2/1992 | Giesbert et al. | 310/90 |
| 5,099,781 | A | * | 3/1992 | Frank | 118/52 |

FOREIGN PATENT DOCUMENTS

| | | |
|---|---|---|
| JP | A 05-161315 | 6/1993 |
| JP | A 2005-151728 | 6/2005 |

* cited by examiner

*Primary Examiner*—Tran N Nguyen
(74) *Attorney, Agent, or Firm*—Oliff & Berridge, PLC

(57) ABSTRACT

According to the present invention, there is provided an automotive alternator which includes a rotor, a stator, a rolling bearing, and a bearing cover. The rotor includes a rotary shaft and works to create a rotating magnetic filed. The stator works to generate an AC power in the rotating magnetic field created by the rotor. The rolling bearing rotatably supports the rotary shaft of the rotor. The bearing cover covers an axial end of the rolling bearing. The bearing cover has flexibility in an axial direction of the rotary shaft and is fitted in place with the flexibility thereof.

13 Claims, 4 Drawing Sheets

AUTOMOTIVE ALTERNATOR HAVING FLEXIBLE BEARING COVER

CROSS-REFERENCE TO RELATED APPLICATION

This application is based on and claims priority from Japanese Patent Application No. 2005-325593, filed on Nov. 10, 2005, the content of which is hereby incorporated by reference into this application.

BACKGROUND OF THE INVENTION

1. Technical Field of the Invention

The present invention relates generally to automotive alternators and bearing covers. More particularly, the invention relates to an automotive alternator that includes a flexible bearing cover.

2. Description of the Related Art

In automotive alternators, rolling bearings are generally provided in bearing boxes and covered at axial ends thereof by bearing covers, so as to be protected from foreign matters, such as water and dust.

For example, Japanese Patent First Publication No. 2005-151728 discloses an automotive alternator, in which two bearing covers respectively cover opposite axial ends of a rear-frame-side rolling bearing. Specifically, each of the bearing covers is configured to include a disc portion, which is disposed in intimate contact with an inner ring of the rolling bearing, and a cylinder portion that is press-fitted on a rotary shaft of the alternator which is supported by the rolling bearing.

With the above configuration, it is required to secure a sufficient space for installation of each of the bearing covers in the alternator. However, depending on the alternator product type, it may be difficult to secure such a sufficient space, particularly, on the side of a pole core mounted on the rotary shaft.

Further, in case that there is formed a restriction portion in the rotary shaft, which is located between the pole core and the rolling bearing to restrict axial movement of the pole core, it may be possible to omit the cylinder portion of the bearing cover and nip only the disc portion of the same between the restriction portion of the rotary shaft and the rolling bearing, thereby fixing the bearing cover.

However, in such a case, since the bearing cover has a fixed width in the axial direction of the rotary shaft, it is necessary to adjust the axial width of the restriction portion of the rotary shaft depending on the alternator product type, thus increasing the manufacturing cost of the alternator.

SUMMARY OF THE INVENTION

The present invention has been made in view of the above-mentioned problems.

It is, therefore, an object of the present invention to provide an automotive alternator which includes a bearing cover that is fitted in place in the alternator without any dimensional change in other members of the alternator.

It is another object of the present invention to provide a bearing cover for a rotary machine which can be fitted in place in the rotary machine without any dimensional change in other members of the rotary machine.

According to one aspect of the present invention, there is provided an automotive alternator which includes a rotor, a stator, a rolling bearing, and a bearing cover.

The rotor includes a rotary shaft and works to create a rotating magnetic field.

The stator works to generate an AC power in the rotating magnetic field created by the rotor.

The rolling bearing rotatably supports the rotary shaft of the rotor.

The bearing cover covers an axial end of the rolling bearing. The bearing cover has flexibility in an axial direction of the rotary shaft and is fitted in place with the flexibility thereof.

Since the bearing cover is fitted in place with the flexibility thereof without any dimensional change in other members of the alternator, the manufacturing cost of the alternator is minimized.

According to a further implementation of the invention, the rotor further includes: a pole core mounted on the rotary shaft; a field winding wound around the pole core; and a restriction member fixedly provided on the rotary shaft to restrict axial movement of the pole core, the restriction member being located between the pole core and the rolling bearing and having an outer diameter greater than that of a fitting portion of the rotary shaft on which the rolling bearing is fitted.

The bearing cover is fitted between the restriction member and the rolling bearing and includes: a flat washer disposed in intimate contact with the axial end of the rolling bearing under contact pressure; and a contact pressure applier working to apply the contact pressure to the flat washer, the contact pressure applier being flexible in the axial direction of the rotary shaft of the rotor.

With the above configuration, it is possible to reliably prevent foreign matters from entering inside of the rolling bearing from the axial end. As a result, the rolling bearing can be reliably protected from the foreign matters.

The restriction member is integrally formed with the rotary shaft.

As an alternative, the restriction member may be annular in shape and joined to the rotary shaft.

As another alternative, the rotor may further include a resin member that has slip rings fixed thereto and is mounted on the rotary shaft, and the restriction member may be formed as part of the resin member.

The rolling bearing includes: an inner ring fitted on the fitting portion of the rotary shaft; an outer ring fitted to a frame of the automotive alternator; and a plurality of rolling elements interposed between the inner and outer rings.

The flat washer of the bearing cover has an outer diameter greater than an outer diameter of the inner ring and less than an inner diameter of the outer ring of the rolling bearing.

With the above configuration, it is possible for the bearing cover to effectively cover the axial end of the rolling bearing without impeding normal function of the rolling bearing.

The contact pressure applier of the bearing cover has a first axial end, at least part of which abuts the flat washer of the bearing cover, and a second axial end at least part of which abuts the restriction member of the rotor.

With the above configuration, it is possible for the contact pressure applier to reliably apply to the flat washer the contact pressure necessary for establishment of the intimate contact between the flat washer and the axial end of the rolling bearing. Further, since no additional means or devices are necessary for fixation of the contact pressure applier, the total parts count of the automotive alternator is minimized.

The contact pressure applier of the bearing cover is configured with a wave washer that is arranged on the rotary shaft of the rotor between the flat washer of the bearing cover and the restriction member of the rotor.

With the above configuration, it is possible to easily make up the flexible bearing cover at low cost.

As an alternative, the contact pressure applier of the bearing cover may be configured with an annular elastic member that is arranged on the rotary shaft of the rotor between the flat washer of the bearing cover and the restriction member of the rotor.

According to another aspect of the present invention, there is provided a bearing cover for use in a rotary machine. The bearing cover is configured to cover an axial end of a rolling bearing that rotatably supports a rotary shaft of the rotary machine. The bearing cover has flexibility in the axial direction of the rotary shaft so as to be easily fitted in place in the rotary machine.

According to a further implementation of the invention, the rotary shat of the rotary machine includes: a first portion on which the rolling bearing is fitted; and a second portion that has a greater outer diameter than the first portion.

The bearing cover is configured to be fitted between the second portion of the rotary shaft and the rolling bearing and includes: a flat washer to be disposed in intimate contact with the axial end of the rolling bearing under contact pressure; and a contact pressure applier working to apply the contact pressure to the flat washer, the contact pressure applier being flexible in the axial direction of the rotary shaft.

The rolling bearing includes: an inner ring fitted on the fitting portion of the rotary shaft; an outer ring fitted to a frame of the rotary machine; and a plurality of rolling elements interposed between the inner and outer rings.

The flat washer has an outer diameter greater than an outer diameter of the inner ring and less than an inner diameter of the outer ring of the rolling bearing.

The contact pressure applier has a first axial end, at least part of which is to abut the flat washer, and a second axial end at least part of which is to abut the second portion of the rotary shaft.

The contact pressure applier is configured with a wave washer that is to be arranged on the rotary shaft of the rotor between the flat washer and the second portion of the rotary shaft.

As an alternative, the contact pressure applier may be configured with an annular elastic member that is to be arranged on the rotary shaft of the rotor between the flat washer and the second portion of the rotary shaft.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

Figure 1:
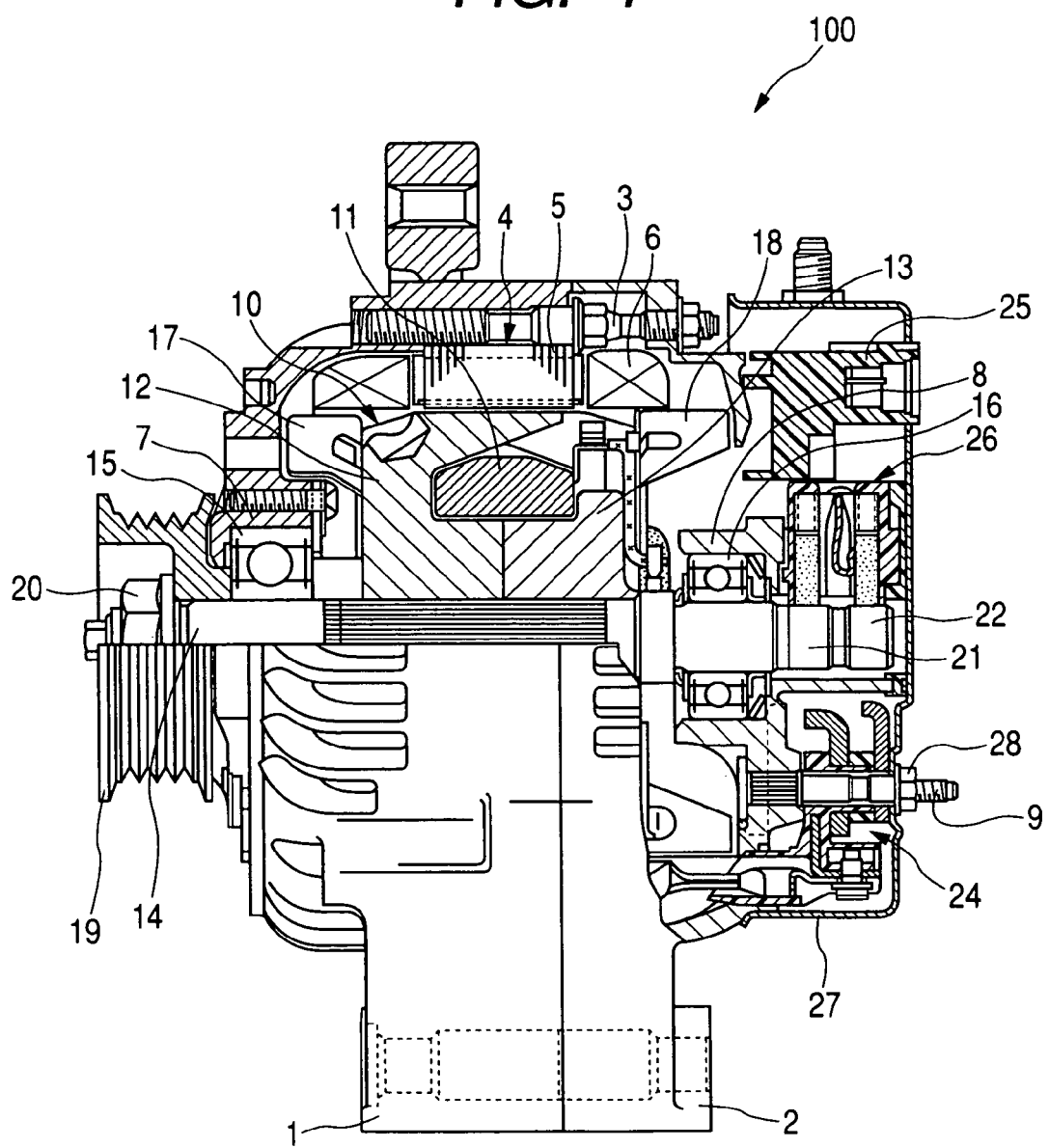
FIG. 1 is a partially cross-sectional view showing the overall structure of an automotive alternator according to the first embodiment of the invention.

The preferred embodiments of the present invention will be described hereinafter with reference to FIGS. 1-7.

It should be noted that, for the sake of clarity and understanding, identical components having identical functions in different embodiments of the invention have been marked, where possible, with the same reference numerals in each of the figures.

FIG. 1 shows the overall structure of an automotive alternator 100 according to the first embodiment of the invention.

As shown in FIG. 1, the automotive alternator 100 includes a front frame 1, a rear frame 2, a stator 4, a rotor 10, a rectifier 24, a voltage regulator 25, a brush assembly 26, and a rear cover 27.

Both the front frame 1 and the rear frame 2 are bowl-shaped; they are fixed together by means of a plurality of bolts 3 with their open ends facing each other. The front frame 1 has the stator 4 fixed to the inner periphery thereof and a cylindrical bearing box 7 formed therein. On the other hand, the rear frame 2 has a cylindrical bearing box 8 formed therein.

The stator 4 includes a stator core 5 and a three-phase stator winding 6 wound around the stator core 5.

The rotor 10 includes a field winding 11, a pair of pole cores 12 and 13, and a rotary shaft 14. The rotary shaft 14 is rotatably supported by a pair of rolling bearings 15 and 16, which are respectively provided in the bearing boxes 7 and 8. The pole cores 12 and 13 are mounted on the rotary shaft 14; the field winding 11 is wound around the pole cores 12 and 13. Thus, the entire rotor 10 is rotatably held by the front and rear frames 1 and 2 via the rolling bearings 15 and 16.

The rotor 10 further includes a pair of centrifugal cooling fans 17 and 18, which are respectively fixed to opposite axial ends of the pole cores 12 and 13. The front-side cooling fan 17 works to create a cooling air flow for cooling of the field winding 11. The rear-side cooling fan 18 works to create a cooling air flow for cooling of the rectifier 24, the voltage regulator 25, and the brush assembly 26.

In addition, a pulley 19 is mounted on a front end portion of the rotary shaft 14 by means of a nut 20, so that the rotor 10 can be driven by a vehicle engine (not shown) via a belt (not shown). On the other hand, a pair of slip rings 21 and 22 is provided on a rear end portion of the rotary shaft 14 outside the rear frame 2, and is electrically connected to field winding 11.

Electrical accessories, including the rectifier 24, the voltage regulator 25, and the brush assembly 26, are fixed to the outside axial end of the rear frame 2 by means of a plurality of bolts 9.

The rectifier 24 works to rectify a three-phase AC power outputted from the three-phase stator winding 6 to a DC power.

The voltage regulator 25 works to regulate an output voltage of the automotive alternator 100 through controlling field current supplied to the field winding 10.

The brush assembly 26 works to supply the field current from the rectifier 24 to the field winding 11 and includes a pair of brushes that are in sliding contacts with the slip rings 21 and 22, respectively.

The rear cover 27, which is made of a steel plate, covers the rectifier 24, the voltage regulator 25, ant the brush assembly 26 from outside of the rear frame 2, thereby protecting them. The rear cover 27 is fixed to the rear frame 2 by fastening nuts 28 to respective bolts 9 extending from the rear frame 2. In addition, the rear cover 27 has formed therein a plurality of cooling air intakes, which are concentrically located around the brush assembly 26.

During operation of the automotive alternator 100, the rear-side cooling fan 18 rotates with rotation of the rotary shaft 14 in a predetermined direction, thereby sucking in cooling air from outside via the cooling air intakes formed in the rear cover 27 and creating the cooling air flow in the axial direction of the rotary shaft 14.

The cooling air flow created by the rear-side cooling fan 18 passes through the rectifier 24, the voltage regulator 25, and the brush assembly 26, thereby cooling them.

However, in some cases, foreign matters, such as water and dust, may be sucked in along with the cooling air flow and flow to the axial ends of the rear-side rolling bearing 16.

Accordingly, to protect the rear-side bearing 16 from such foreign matters, in the present embodiment, there are provided two different bearing covers respectively at the axial ends of the rear-side rolling bearing 16.

Figure 2:
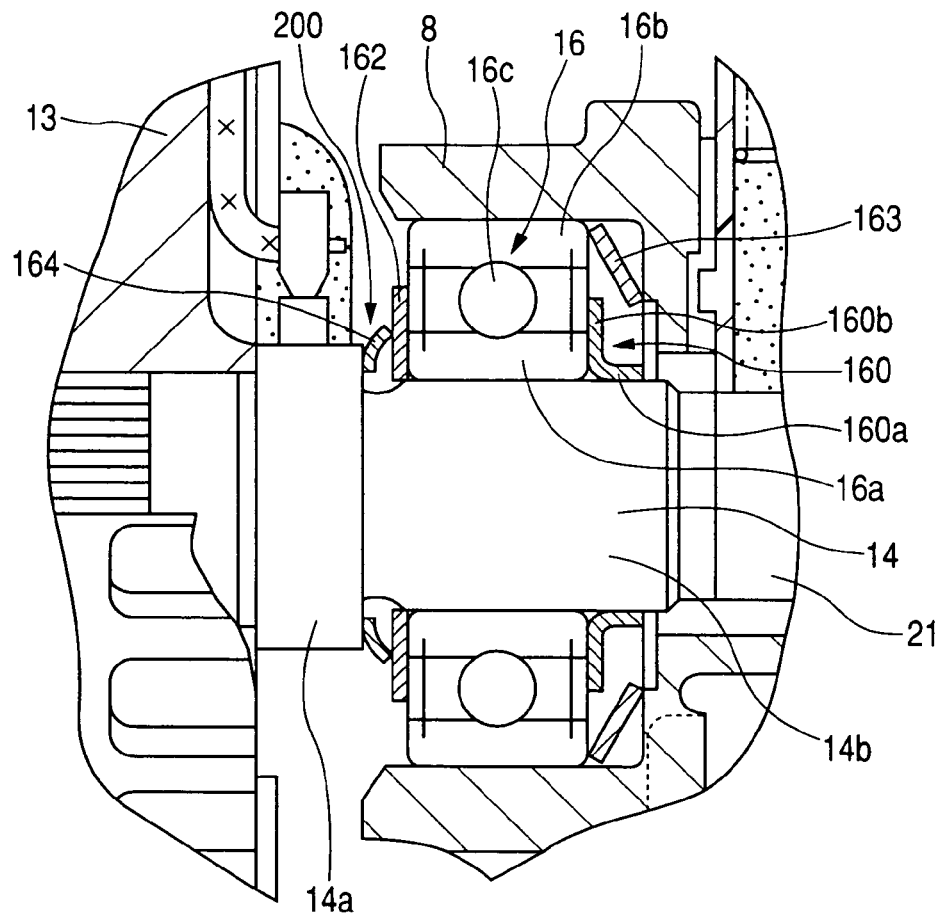
FIG. 2 is an enlarged partially cross-sectional view showing the configuration of a bearing cover according to the first embodiment of the invention.

Specifically, referring to FIG. 2, the rotary shaft 14 includes a restriction portion 14a and a fitting portion 14b.

The restriction portion 14a abuts the rear-side pole core 13 and works to restrict backward axial movement of the pole cores 12 and 13.

The fitting portion 14b is provided between the restriction portion 14a and the slip ring 21 and has the rear-side rolling bearing 16 fitted thereon. In addition, the fitting portion 14b has a smaller outer diameter than the restriction portion 14a.

The rolling bearing 16 includes an inner ring 16a, an outer ring 16b, and a plurality of balls 16c. The inner ring 16a is fitted on the fitting portion 14b of the rotary shaft 14. The outer ring 16b is fitted to the rear-side bearing box 8. The balls 16c are retained between the inner and outer rings 16a and 16 by a retainer (not shown).

At the rear-side axial end of the rolling bearing 16, there is provided a bearing cover 160 of the previously-described existing type. On the other hand, at the front-side axial end of the rolling bearing 16, there is provided a bearing cover 200 according to the present embodiment.

The bearing cover 160 includes a cylinder portion 160a and a disc portion 160b. The cylinder portion 160a is fitted on and thus fixed to the rotary shaft 14. The disc portion 160b abuts the rear-side axial end of the rolling bearing 16 and has an outer diameter greater than the outer diameter of the inner ring 16a and less than the inner diameter of the outer ring 16b of the rolling bearing 16. In addition, there is provided a wave washer 163 behind the rolling bearing 16 in the bearing box 8, which urges the outer ring 16b of the rolling bearing 16 forward, thereby restricting backward movement of the rolling bearing 16.

Figure 3A:
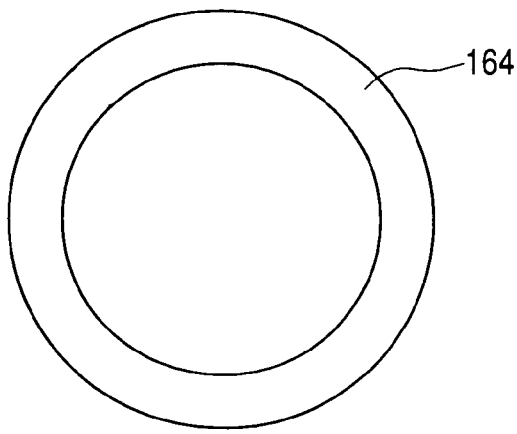
FIGS. 3A-3B are views showing the shape of a wave washer included in the bearing cover of FIG. 2.
Figure 3B:
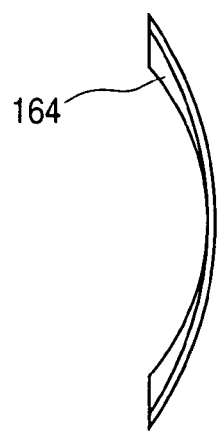

The bearing cover 200 is configured with a flat washer 162 and a wave washer 164. The flat washer 162 abuts the front-side axial end of the rolling bearing 16 and has an outer diameter greater than the outer diameter of the inner ring 16a and less than the inner diameter of the outer ring 16b of the rolling bearing 16. The wave washer 164, which has a shape as shown in FIGS. 3A-3B, is just fitted with its elasticity in the gap between the flat washer 162 and the restriction portion 14a of the rotary shaft 14. The wave washer 164 functions as a contact pressure applier to apply contact pressure to the flat washer 162, thereby bringing the flat washer 162 into intimate contact with the front-side axial end of the rolling bearing 16 under the contact pressure. The wave washer 164 has a rear-side axial end, at least part of which abuts the flat washer 162, and a front-side axial end at least part of which abuts the restriction portion 14a of the rotary shaft 14.

As above, in the automotive alternator 100 according to the present embodiment, the bearing cover 200 has flexibility in the axial direction of the rotary shaft 14, which is derived from the elasticity of the wave washer 164. The bearing cover 200 is just fitted in the gap between the restriction portion 14a of the rotary shaft 14 and the rolling bearing 16 with the flexibility thereof.

Since the bearing cover 200 is fitted in the gap with its flexibility without adjusting the axial width of the restriction portion 14a, the manufacturing cost of the automotive alternator 100 is minimized.

Further, since the flat washer 162 is in intimate contact with the front-side axial end of the rolling bearing 16 under the contact pressure applied by the wave washer 164, it is possible to reliably prevent foreign matters from flowing into the rolling bearing 16 from the front-side axial end. As a result, the rolling bearing 16 can be reliably protected from the foreign matters.

Furthermore, since the flat washer 162 has the outer diameter greater than the outer diameter of the inner ring 16a and less than the inner diameter of the outer ring 16b of the rolling bearing 16, it is possible for the bearing cover 200 to effectively cover the front-side axial end of the rolling bearing 16 without impeding normal function of the rolling bearing 16.

Moreover, in the present embodiment, at least part of the rear-side axial end of the wave washer 164 abuts the flat washer 162, while at least part of the front-side axial end of the same abuts the restriction portion 14a of the rotary shaft 14.

With this configuration, it is possible for the wave washer 164 to reliably apply the contact pressure to the flat washer 162. Further, since no additional means or devices are necessary for fixation of the wave washer 164, the total parts count of the automotive alternator 100 is minimized.

In addition, both the flat and wave washers 162 and 164 are generally easily obtainable at low cost. Accordingly, the flexible bearing cover 200 can be easily made up at low cost.

Figure 4:
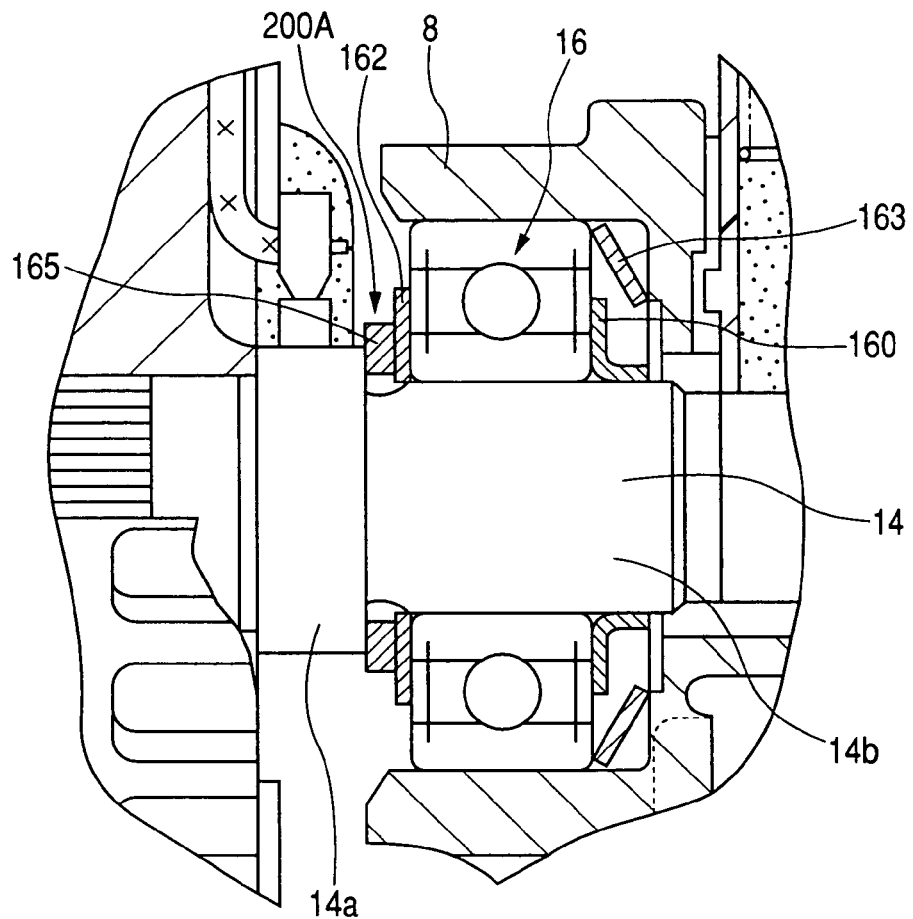
FIG. 4 is an enlarged partially cross-sectional view showing the configuration of a bearing cover according to the second embodiment of the invention.

FIG. 4 shows the configuration of a bearing cover 200A according to the second embodiment of the invention, which is provided in the automotive alternator 100 as a substitute for the bearing cover 200 according to the first embodiment.

As shown in FIG. 4, the bearing cover 200A is configured with the flat washer 162 and an elastic member 165 that is made, for example, of rubber.

Figure 5A:
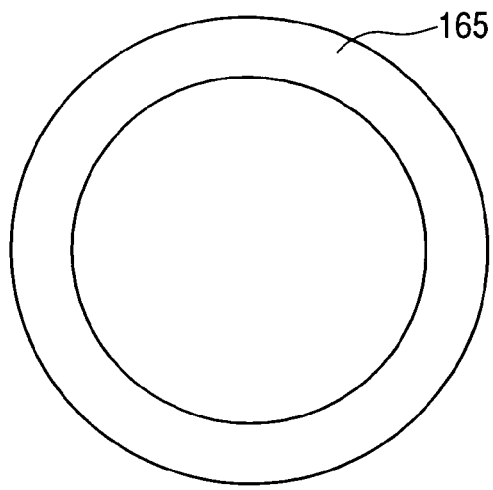
FIGS. 5A-5B are views showing the shape of an elastic member included in the bearing cover of FIG. 4.
Figure 5B:
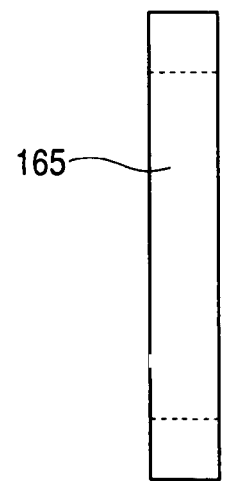

The elastic member 165 has, as shown in FIGS. 5A and 5B, an annular shape. The elastic member 165 is used in place of the wave washer 164 to apply the contact pressure necessary for establishment of the intimate contact between the flat washer 162 and the front-side axial end of the rolling bearing 16.

More specifically, the elastic member 165 is just fitted, with its elasticity, in the gap between the flat washer 162 and the restriction portion 14a of the rotary shaft 14. Further, the elastic member 165 has a rear-side axial end, at least part of which abuts the flat washer 162, and a front-side axial end at least part of which abuts the restriction portion 14a of the rotary shaft 14.

The bearing cover 200A has the same advantages as the bearing cover 200 according to the first embodiment.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the rotary shaft 14 is configured to have different outer diameters in the portions 14*a* and 14*b*, and the restriction portion 14*a* with the greater outer diameter works to restrict backward axial movement of the pole cores 12 and 13.

As an alternative to the above configuration, the rotary shaft 14 may be configured to have the same outer diameter in the portions 14*a* and 14*b*, and an additional annular member may be fitted on the portion 14*a* of the rotary shaft 14 to restrict backward axial movement of the pole cores 12 and 13.

As another alternative to the above configuration, the rotary shaft 14 may be configured to have the same outer diameter in the portions 14*a* and 14*b*, and a resin member for fixation of the slip rings 21 and 22 may be configured to have a flange portion to restrict backward axial movement of the pole cores 12 and 13.

Figure 6:
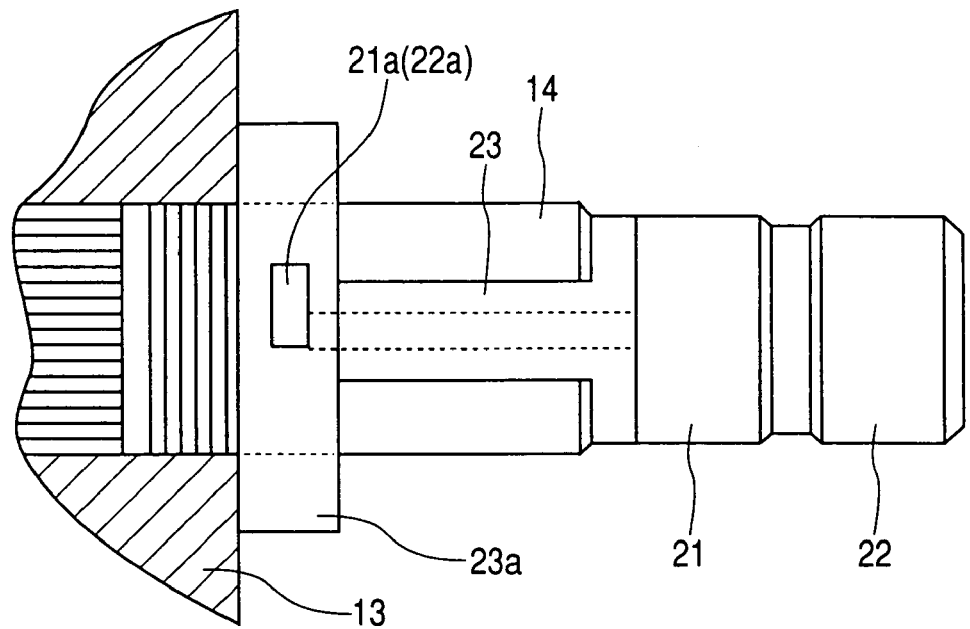
FIG. 6 is a side view showing a resin member for fixation of slip rings after its installation to a rotary shaft of the automotive alternator of FIG. 1.
Figure 7:
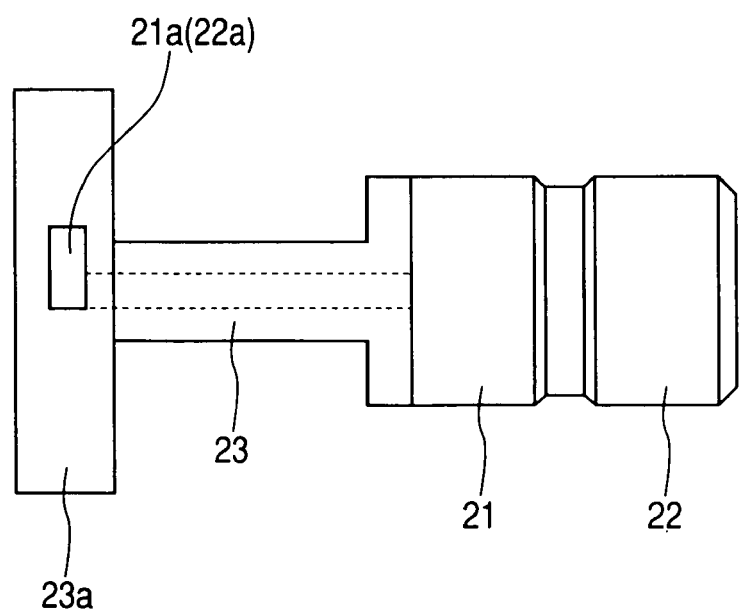
FIG. 7 is a side view showing the resin member for fixation of slip rings before its installation to the rotary shaft of the automotive alternator of FIG. 1.

More specifically, referring to FIGS. 6-7, the resin member 23, which has the slip rings 21 and 22 fixed thereto and is mounted on the rotary shaft 14, may be configured to have the flange portion 23*a*, thereby restricting backward axial movement of the pole cores 12 and 13. Further, two leads 21*a* and 22*a*, which are embedded in the resin member 23, may be configured to axially extend from the respective slip rings 21 and 22 to the flange portion 23*a* and radially protrude out of the flange portion 23*a* so as to be connected to the field winding 11.

Furthermore, in the previous embodiments, the bearing covers 200 and 200A are employed in the automotive alternator 100 to protect the rolling bearing 16 from foreign matters.

However, the bearing covers 200 and 200A may also be employed in any other rotary machines to protect a rolling bearing therein from foreign matters.

Such modifications, changes, and improvements within the skill of the art are intended to be covered by the appended claims.

What is claimed is:

1. An automotive alternator comprising:
    a rotor including a rotary shaft and working to create a rotating magnetic field;
    a stator working to generate an AC power in the rotating magnetic field created by the rotor;
    a rolling bearing rotatably supporting the rotary shaft of the rotor; and
    a bearing cover covering an axial end of the rolling bearing, the bearing cover having flexibility in an axial direction of the rotary shaft, the axial flexibility allowing the bearing cover to be fitted in place,
    wherein the rotor further includes:
        a pole core mounted on the rotary shaft;
        a field winding wound around the pole core; and
        a restriction member fixedly provided on the rotary shaft to restrict axial movement of the pole core, the restriction member being located between the pole core and the rolling bearing and having an outer diameter greater than that of a fitting portion of the rotary shaft on which the rolling bearing is fitted, and
    wherein the bearing cover is fitted between the restriction member and the rolling bearing and includes:
        a flat washer disposed in intimate contact with the axial end of the rolling bearing under contact pressure; and
        a contact pressure applier working to apply the contact pressure to the flat washer, the contact pressure applier being flexible in the axial direction of the rotary shaft of the rotor.

2. The automotive alternator as set forth in claim 1, wherein the restriction member is integrally formed with the rotary shaft.

3. The automotive alternator as set forth in claim 1, wherein the restriction member is annular in shape and joined to the rotary shaft.

4. The automotive alternator as set forth in claim 1, wherein the rotor further includes a resin member that has slip rings fixed thereto and is mounted on the rotary shaft, and wherein the restriction member is formed as part of the resin member.

5. The automotive alternator as set forth in claim 1, wherein the rolling bearing includes:
    an inner ring fitted on the fitting portion of the rotary shaft;
    an outer ring fitted to a frame of the automotive alternator; and
    a plurality of rolling elements interposed between the inner and outer rings, and
    wherein the flat washer of the bearing cover has an outer diameter greater than an outer diameter of the inner ring and less than an inner diameter of the outer ring of the rolling bearing.

6. The automotive alternator as set forth in claim 1, wherein the contact pressure applier of the bearing cover has a first axial end, at least part of which abuts the flat washer of the bearing cover, and a second axial end at least part of which abuts the restriction member of the rotor.

7. The automotive alternator as set forth in claim 1, wherein the contact pressure applier of the bearing cover is configured with a wave washer that is arranged on the rotary shaft of the rotor between the flat washer of the bearing cover and the restriction member of the rotor.

8. The automotive alternator as set forth in claim 1, wherein the contact pressure applier of the bearing cover is configured with an annular elastic member that is arranged on the rotary shaft of the rotor between the flat washer of the bearing cover and the restriction member of the rotor.

9. A bearing cover for use in a rotary machine, the bearing cover being configured to cover an axial end of a rolling bearing that rotatably supports a rotary shaft of the rotary machine, the bearing cover having flexibility in the axial direction of the rotary shaft so as to be easily fitted in place in the rotary machine,
    wherein the rotary shaft of the rotary machine includes:
        a first portion on which the rolling bearing is fitted; and
        a second portion that has a greater outer diameter than the first portion, and
    wherein the bearing cover is configured to be fitted between the second portion of the rotary shaft and the rolling bearing and includes:
        a flat washer to be disposed in intimate contact with the axial end of the rolling bearing under contact pressure; and
        a contact pressure applier working to apply the contact pressure to the flat washer, the contact pressure applier being flexible in the axial direction of the rotary shaft.

10. The bearing cover as set forth in claim 9, wherein the rolling bearing includes:
    an inner ring fitted on the fitting portion of the rotary shaft;
    an outer ring fitted to a frame of the rotary machine; and
    a plurality of rolling elements interposed between the inner and outer rings, and wherein the flat washer has an outer diameter greater than an outer diameter of the inner ring and less than an inner diameter of the outer ring of the rolling bearing.

11. The bearing cover as set forth in claim 9, wherein the contact pressure applier has a first axial end, at least part of which is to abut the flat washer, and a second axial end at least part of which is to abut the second portion of the rotary shaft.

12. The bearing cover as set forth in claim 9, wherein the contact pressure applier is configured with a wave washer that is to be arranged on the rotary shaft of the rotor between the flat washer and the second portion of the rotary shaft.

13. The bearing cover as set forth in claim 9, wherein the contact pressure applier is configured with an annular elastic member that is to be arranged between the flat washer and the second portion of the rotary shaft.

* * * * *